United States Patent [19]

Johnston, Jr. et al.

[11] Patent Number: 5,694,151
[45] Date of Patent: *Dec. 2, 1997

[54] METHOD AND APPARATUS FOR PROVIDING VISUAL FEEDBACK DURING MANIPULATION OF TEXT ON A COMPUTER SCREEN

[75] Inventors: Robert G. Johnston, Jr., Cupertino; Scott Jenson, Redwood City, both of Calif.

[73] Assignee: Apple Computer, Inc., Cupertino, Calif.

[*] Notice: The term of this patent shall not extend beyond the expiration date of Pat. No. 5,561,444.

[21] Appl. No.: 626,295

[22] Filed: Apr. 1, 1996

Related U.S. Application Data

[63] Continuation of Ser. No. 294,195, Aug. 22, 1994, Pat. No. 5,561,444, which is a continuation of Ser. No. 993,784, Dec. 21, 1992, abandoned.

[51] Int. Cl.⁶ ................................................. G09G 5/08
[52] U.S. Cl. ............................ 345/145; 345/121; 345/127
[58] Field of Search .................................. 345/121, 122, 345/124, 125, 127, 130, 145, 146, 157

[56] References Cited

U.S. PATENT DOCUMENTS

| | | | |
|---|---|---|---|
| 4,922,448 | 5/1990 | Kunieda et al. | 364/900 |
| 4,937,439 | 6/1990 | Wanninger et al. | 235/456 |
| 5,040,131 | 8/1991 | Torres | 395/159 |
| 5,157,763 | 10/1992 | Peters et al. | 395/357 |
| 5,561,444 | 10/1996 | Johnston, Jr. et al. | 345/145 |

OTHER PUBLICATIONS

WordPerfect for Windows, Version 5.1 Program Release Apr. 30, 1992.

MACPAINT for Macintosh 1983.

Apple Human Interface Guidelines: The Apple Desktop Interface, Addison–Wesley Publishing Company, Inc., pp. 119–120 (undated).

*Primary Examiner*—Regina D. Liang
*Attorney, Agent, or Firm*—Blakely, Sokoloff, Taylor & Zafman

[57] ABSTRACT

A method and apparatus providing visual feedback to a computer user while dragging selected text is described. As its first step, the processing logic creates a text object from the selected text once the computer user has initiated a drag. Simultaneously, the selected text is visually de-emphasized. Secondly, the processing logic snaps the text object to the cursor so that the text object follows the cursor without obscuring text at the insertion point. Finally, when the computer user selects the final insertion point, the selected text is visually zoomed from the source location to the final insertion point.

5 Claims, 4 Drawing Sheets

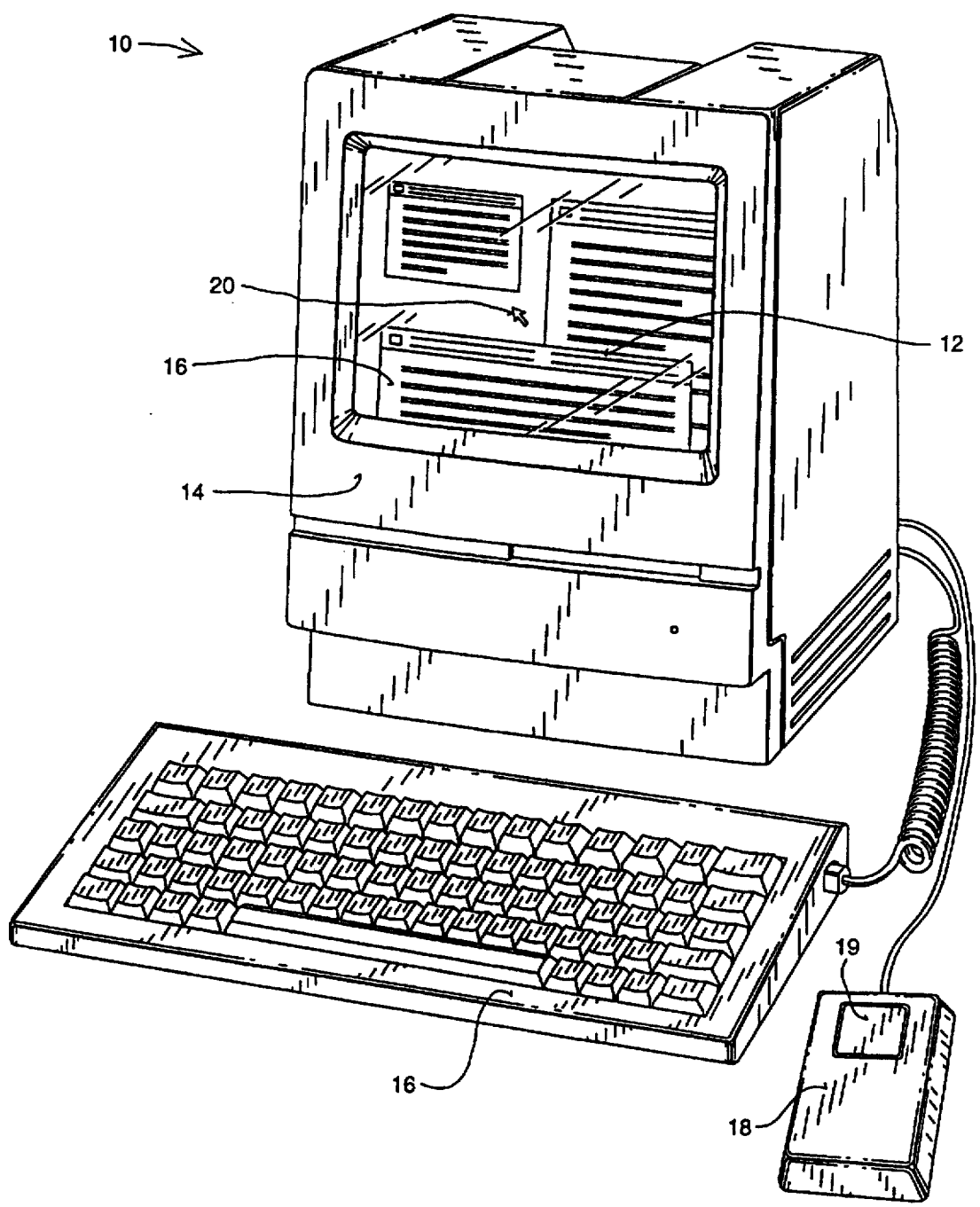
FIG_1

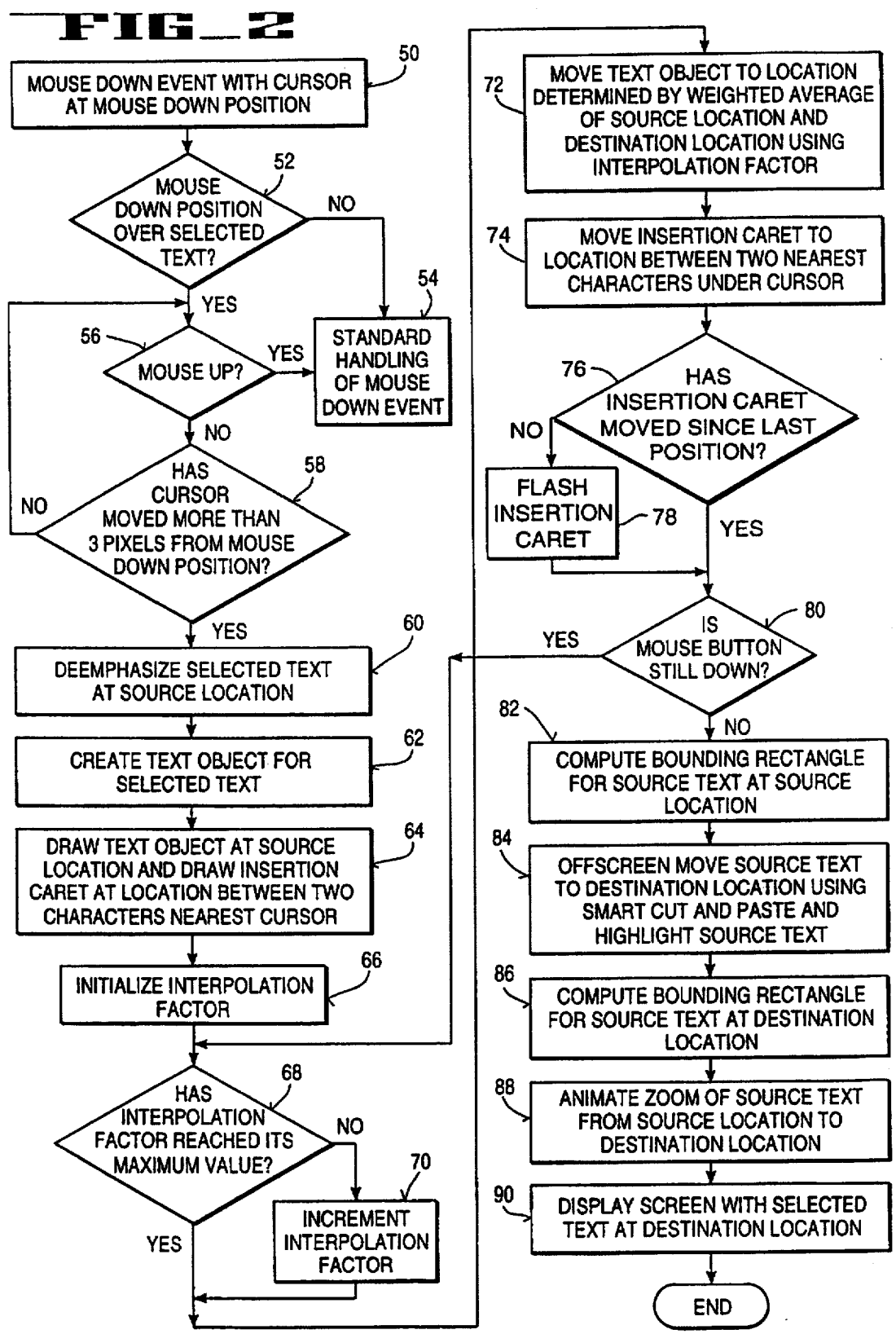

FIG_3A
INITIAL SELECTION
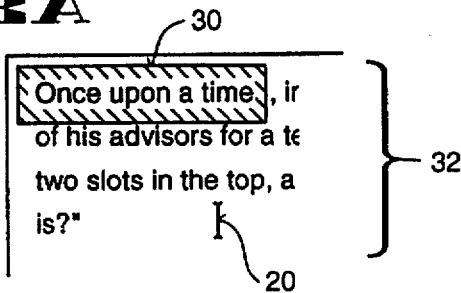
FIG_3B
MOUSE DOWN
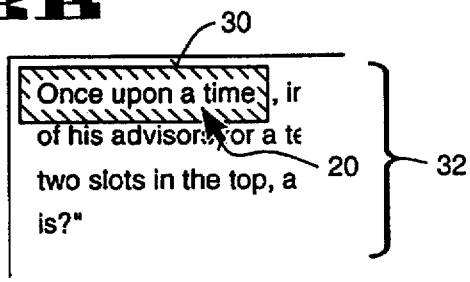
FIG_3C
BEGIN DRAG
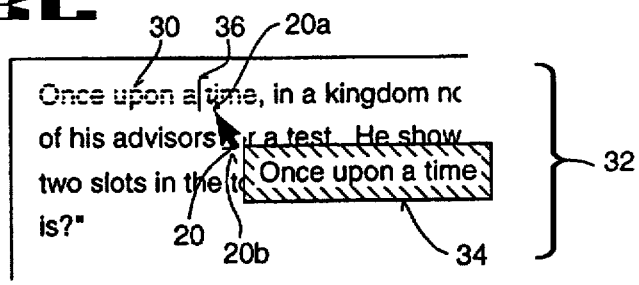
FIG_3D
TRACKING
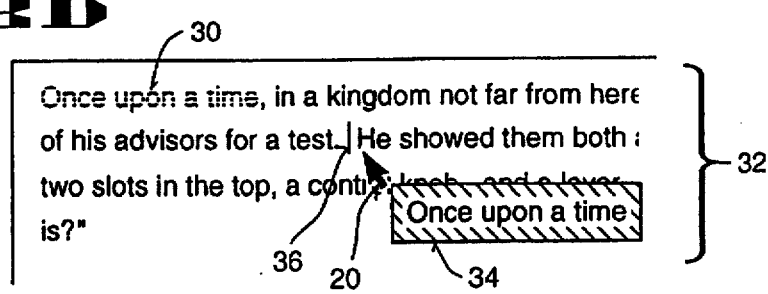
FIG_3E
FINAL STATE
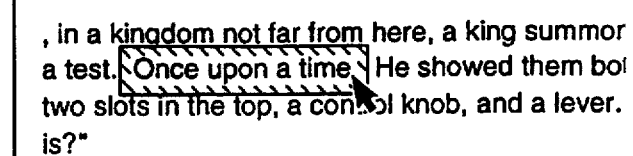

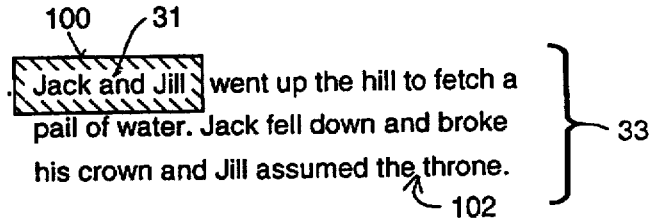
FIG_4A
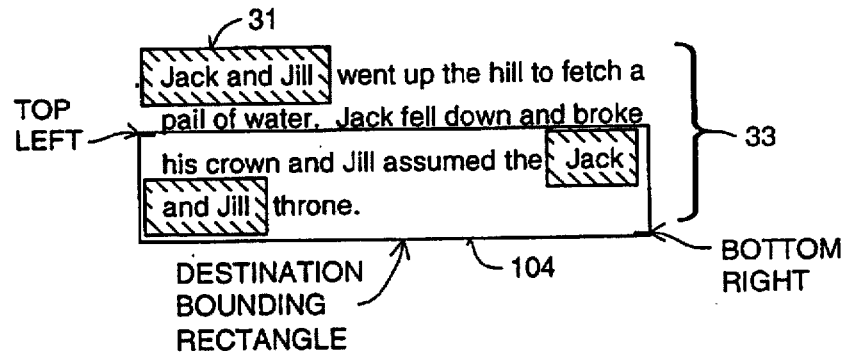
FIG_4B
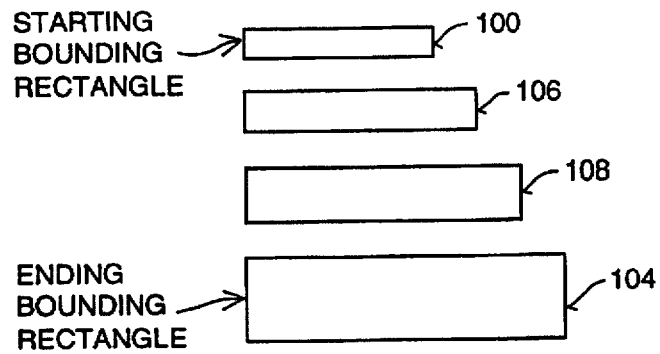
FIG_4C
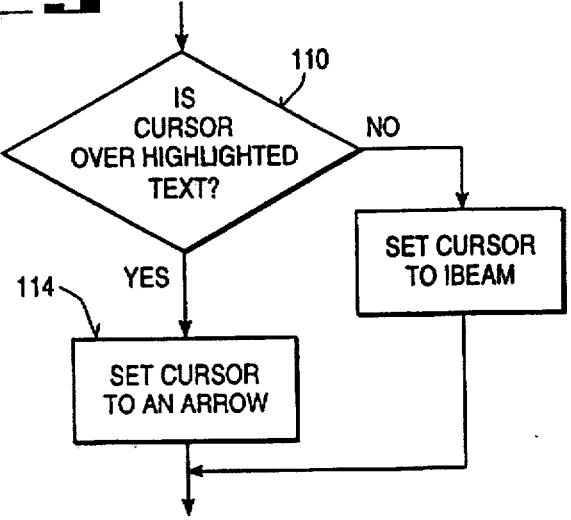
FIG_5

METHOD AND APPARATUS FOR PROVIDING VISUAL FEEDBACK DURING MANIPULATION OF TEXT ON A COMPUTER SCREEN

This is a continuation of application Ser. No. 08/294,195, filed Aug. 22, 1994 now U.S. Pat. No. 5,561,444, which is a continuation of application Ser. no. 07/993,784, filed Dec. 21, 1992 abandoned.

FIELD OF THE INVENTION

The present invention pertains to a method and apparatus for providing user feedback in a computer system. More particularly, the present invention pertains to a method and apparatus for providing visual feedback to a computer user while manipulating text on a computer screen.

BACKGROUND OF THE INVENTION

Many computer systems include graphical user interfaces. Graphical user interfaces typically include a user interface window, more commonly referred to as a desktop window. While operating within the desktop window computer users are able to manipulate graphical objects, i.e. icons, using a cursor control device such as a mouse or trackball. Icons can be moved simply by pointing, clicking and dragging. During these operations the computer user receives visual feedback that enhances the feeling of physical control over the desktop window and the icons therein. For example, selected icons are highlighted and, while the mouse button is held down, the selected icon moves with the cursor.

Moving text within word processor files is not as easy. Highlighted text cannot be dragged about a document as if it were an icon. There is no way to "grab" the highlighted text. As a result, computer users do not have a feeling of physical control during cut, copy and paste operations.

SUMMARY OF THE INVENTION

The present invention provides a method and apparatus providing visual feedback to a computer user while dragging selected text. As its first step, the processing logic of the present invention creates a text object from the selected, highlighted text when the computer user initiates a drag. Simultaneously, the selected text is visually de-emphasized. Secondly, after the cursor begins to move, the processing logic snaps the text object to the cursor so that the text object follows the cursor without obscuring the insertion point. The computer user is then free to move about text onscreen in search of an insertion point. Finally, when the computer user selects the insertion point, the selected text is visually zoomed from the source location to the insertion point. As a result, the computer user has a feeling of physical control while moving selected text within a document.

Other objects, features, and advantages of the present invention will be apparent from the accompanying drawings and the detailed description that follows.

BRIEF DESCRIPTION OF THE FIGURES

The present invention is illustrated by way of example and not limitation in the figures of the accompanying drawings in which references indicate similar elements and in which:

FIG. 1 is an illustration of a computer system.

FIG. 2 is a flow diagram of a method of providing visual feedback while directly manipulating text.

FIG. 3A illustrates the selection of text.

FIG. 3B illustrates the change of cursor caused by a mouse down event.

FIG. 3C illustrates the placement of the text object relative to the cursor during a drag.

FIG. 3D illustrates the tracking of the text object during a drag.

FIG. 3E illustrates the placement of the text object after a mouse up event.

FIG. 4A illustrates a bounding rectangle at a source location.

FIG. 4B illustrates a bounding rectangle at a destination location.

FIG. 4C illustrates a zoom from a bounding rectangle at a source location to a bounding rectangle at a destination location.

FIG. 5 is a flow diagram of an idle loop for changing the shape of the cursor.

DETAILED DESCRIPTION

FIG. 1 illustrates a computer system 10 in which the present processing logic of the invention operates. Computer system 10 is illustrated as an Apple Macintosh™ computer system, however, those of ordinary skill in the art will understand that alternative computer systems may be used. Computer system 10 includes a monitor 12 for visually displaying information to a computer user, a central processing unit (CPU), and internal memory, enclosed by housing 14. Keyboard 16 allows a computer user to provide input to the CPU. Computer system 10 also includes a cursor control device, such as mouse 18, or a trackball, joystick, or special keys capable of signaling movement in a particular direction. By moving mouse 18 the computer user is able to control the movement of the two or three dimensional movement of a visible symbol, such as cursor 20, on monitor 12. Computer system 10 also includes a signal generation device for signaling active and inactive control states. The signal generation device may be realized using a switch or button 19 on or near the cursor control device. The up position of button 19 signals the inactive control state while the down position of button 19 signals the active control state.

Computer system 10 includes an operating system capable of tracking the position of mouse 18 and cursor 20. The operating system also detects the state of the signal generation device and reports the position of cursor 20 in each state of the signal generation device. These features of an operating system are well known in the art. Therefore, they will not be described in detail here.

The processing logic of the present invention is stored within the internal memory of computer system 10, or on other machine readable media, and executed by the CPU. The processing logic can be separately compiled or loaded entity or incorporated as part of a larger word processing system. In either case, the processing logic of the present invention may be activated using techniques well known to those of ordinary skill in the art.

Briefly described, the processing logic of the present invention provides visual feedback to users of computer system 10 during direct manipulation of text within a word processing application. That visual feedback includes de-emphasizing selected text at a source location, creating a text object resembling the selected text and "snapping" the text object to the pointer such that the text object travels with the pointer. Once a destination location is chosen, the selected text is visually "zoomed" from the source location to the destination location.

FIG. 2 illustrates in flow diagram form the operation of the processing logic of the present invention. FIG. 3 illustrates the effect of the processing logic upon selected text 30 in relation to displayed text 32.

Referring now to FIG. 2, the processing logic performs two major tasks: determining whether visual feedback is required and providing that visual feedback. In steps 50–58 the processing logic determines whether visual feedback is required. The computer user indicates the desire for visual feedback by pressing mouse button 19 down while cursor 20 is over selected text 30, continuing to hold down mouse button 19 and moving cursor 20 from its position at the time of the mouse down event. The processing logic generates visual feedback during the manipulation of selected text 30 in steps 60–90. The processing logic generates visual feedback for the computer user until after mouse button 19 is released; i.e., returns to the up position and the inactive state. Visual feedback while mouse button 19 is down includes generation of a text object, snapping the text object to the cursor, flashing the insertion caret at location under cursor and moving the text object with the cursor. Once the computer user releases mouse button 19 it returns to its up position, selected text 30 is visually zoomed from the source location to the destination location.

The processing logic is not activated until after text has been selected from the text displayed on monitor 12. In FIG. 3A, selected text 30, "Once upon a time," is indicated by reverse video, which distinguishes it from text 32 displayed on monitor 12.

After text 30 has been selected, the processing logic waits in step 50 for a mouse down event. When the mouse down event occurs, the processing logic is also informed of the cursor position at the time of the mouse down event. Let us refer to this cursor position as the "mouse down position." Afterward, the processing logic advances to step 52.

In step 52 the processing logic determines whether the computer user may require visual feedback to accompany the manipulation of selected text 30. This determination is made by comparing the mouse down position to the coordinates of selected text 30. The user does not require visual feedback for text manipulation if the computer user pressed mouse button 19 down while cursor 20 was not over selected text 30. In that case, the processing logic branches to step 54 to handle the mouse down event in a conventional and appropriate manner. On the other hand, visual feedback may be required if the mouse down position was over selected text 30. The processing logic advances to step 56 to determine if so.

In step 56 the processing logic waits to see if the computer user requires visual feedback to accompany manipulation of selected text. The computer user does not require visual feedback if a mouse up event occurs before cursor 20 is moved from the mouse down position. Accordingly, the processing logic branches to step 54 to handle the mouse up as if a mouse down event occurred at the original mouse down location. However, in the absence of a mouse up event, the processing logic branches to step 58.

In step 58 the processing logic determines the current position of cursor 20. Let us refer to this position as the "current cursor position." If the current cursor position is some arbitrary distance away from the mouse down position the computer user has indicated a desire to move, or pick-up, selected text 30. In one embodiment, the current cursor position is chosen to be three pixels away from the mouse down position to indicate a desire to manipulate selected text 30. The distance chosen may vary according to needs of the computer user. The processing logic responds to movement of cursor 20 while mouse button 19 is still down by branching to step 60. On the other hand, if the cursor current position is still very close to the mouse down position, then the processing logic continues to await indication of whether or not visual feedback is desired by branching back up to step 56.

With step 60 the processing logic begins providing visual feedback to the computer user by de-emphasizing selected text 30. Selected text 30 can be de-emphasized in a number of ways that will be apparent to those skilled in the art. In one embodiment, de-emphasis of selected text 30 is performed using a QuickDraw™ brand graphics processing routine, which transforms the white areas surrounding the text to light gray and black letters of the text to medium gray. FIG. 3C illustrates de-emphasized selected text 30a according to this scheme. De-emphasis of selected text 30 achieved, the processing logic advances to step 62.

In step 62 the processing logic creates text object 34 from selected text 30. As used herein "text object" refers to a visual representation of selected text 30, which may or may not include all of selected text 30. Text object 34 need only include sufficient text to remind the computer user selected text 30 without unnecessarily obscuring much of the text 32 displayed on monitor 12. Text object 34 may be created by generating a bit map of selected text 30 and limiting its size. Text object 34 may also be represented by a dotted outline of selected text 30, similar to what computer users see when they drag icons within the desktop window. Such a representation of text object 34 requires less CPU time but does not inform the computer user of selected text 30 which is being moved.

Text object 34 may also be emphasized as compared to displayed text 32. In one embodiment, text object 34 is emphasized using reverse video. Other methods of emphasizing text object 34 will be obvious to those skilled in the art. Therefore, the manner of creating and emphasizing text object 34 will not be described in detail herein. The processing logic branches to step 64 after its creation of text object 34.

The processing logic displays text object 34 at the source location during step 64. As used herein, "source location" refers to the initial location of selected text 30. Stated another way, "source location" refers to the location that is the source of selected text 30.

Because it is initially displayed at the source location, text object 34 obscures de-emphasized selected text 30 if they are both the same size. Once text object 34 is moved it no longer obscures selected text 30. The processing logic also displays insertion caret 36 near cursor 20 in step 64. As using herein "insertion caret" refers to any visual representation that indicates to the computer user the precise location in a body of text where selected text 30 may be inserted. According to common word processing conventions, insertion caret 36 is visually represented by a thin vertical line.

To provide further visual emphasis that the computer user is able to manipulate selected text 30, cursor 20 may be displayed as an arrow. Processing logic for doing So will be described in detail herein below. When cursor 20 is displayed as an arrow, insertion caret 36 is preferably displayed near tip 20a of cursor 20, as shown in FIGS. 3C and 3E. Initial display of insertion caret 36 and text object 34 begun the processing logic proceeds to step 66.

The processing logic begins the process of snapping text object 34 to cursor 20 in step 66. The processing logic does this by initializing an interpolation factor, which is used to snap text object 34 to cursor 20 in a discrete and finite number of steps. Text object 34 is gradually moved to cursor 20 to prevent computer users from becoming disoriented by text object 34 appearing in an unfamiliar location. This done, the processing logic enters the snapping and tracking logic by branching to step 68.

The loop of steps 68–90 snaps text object 34 to cursor 20 and, once snapped, ensures that text object follows the movement of cursor 20 on monitor 12. The first step within the loop is determining whether the interpolation factor has reached its maximum value of one. If it has not, text object 34 has not yet snapped to cursor 20. To continue snapping, the processing logic branches to step 70. On the other hand, if text object 34 has snapped to cursor 20, as indicated by the maximum value of the interpolation factor, the processing logic advances to step 72.

During step 70 the interpolation factor is incremented. The amount by which the interpolation factor is incremented depends upon the choice of the number of steps for text object 34 to reach cursor 20. For example, if the number of steps chosen for text object 34 to reach cursor 20 is four, then the interpolation factor is incremented by 0.25 each pass through step 70. The number of steps chosen will depend upon the visual effect and response time desired. After incrementing the interpolation factor, the processing logic branches to step 72.

The processing logic moves text object 34 in step 72 to a location determined by the interpolation factor and the current distance between the source location and cursor 20. Thus, if the interpolation factor has not yet reached its maximum value, text object 34 will be moved toward cursor 20 along an imaginary straight line between the source location and cursor 20 to a locating determined by the distance multiplied by the interpolation factor. Stated another way, during step 72 text object 34 is moved to a location determined by a weighted average of the source location and the destination location using the interpolation factor. When the interpolation factor reaches its maximum value, text object 34 snaps to cursor 20. Thereafter, text object 34 follows the movement of cursor 20 providing a visual impression that text object 34 is attached to cursor 20. This, in turn, gives the computer user a feeling of physical control.

In one embodiment, text object 34 is snapped to the lower left hand of cursor 20, as shown in FIGS. 3C and 3D. This location prevents text object 34 from obscuring insertion caret 36 and focuses the computer user's attention on insertion caret 36 and cursor 20 while maintaining the strong visual impression that text object 34 is attached to cursor 20. Those skilled in the art will appreciate that other locations near or on cursor 20 may also convey the same visual impression.

After moving text object in step 72, the processing logic advances to step 74. There the processing logic moves insertion caret 36 if cursor 20 has moved. Insertion caret 36 is moved to a location between the two characters nearest to cursor 20. This done the processing logic advances to step 76.

During step 76 the processing logic compares the current location of insertion caret 36 to its previous location. If insertion caret 36 has not moved from its previous location, the processing logic advances to step 78. There insertion caret 36 is "flashed," or blinked on and off, indicating an idle state. On the other hand, if insertion caret 36 changed its location during step 74 then the processing logic advances to step 80.

In step 80 the processing logic determines whether the computer user has selected an insertion point, or destination location, for selected text 30. (As used herein "destination location" refers to the position of cursor 20 at the time to of a mouse up event.) The processing logic makes this determination by discovering whether a mouse up event has occurred. A mouse up event necessarily accompanies selection of a destination location or insertion point. The location of cursor 20 at the time of the mouse up event determines the insertion point for selected text 30. The processing logic responds to a mouse up event by branching to step 82. Conversely, the absence of a mouse up event indicates that the computer user has not yet selected the destination location. The processing logic responds to this state of affairs by branching back to the start of the tracking and snapping loop, step 68.

After the mouse up event, with step 82 the processing logic begins the process of indicating visually to the computer user the movement of selected text 30 from the source location to the destination location. This involves three steps. First, the processing logic calculates bounding rectangles for selected text 30 at both the source location and the destination location. Second, the processing logic zooms from the first bounding rectangle at the source location to the second bounding rectangle at the destination location. Finally, selected text 30 is displayed at the destination location in the third and final step.

In step 82 the processing logic computes a bounding rectangle for selected text 30 at the source location. This step, and the second, are illustrated in FIG. 4 using selected text 31; i.e., "Jack and Jill." Bounding rectangle 100 is defined by two points of selected text 31: the point furthest to the top left and the point furthest to the bottom right. The dimensions of bounding rectangle 100 computed, the processing logic proceeds to step 84. These points are chosen because the selected text may span vertically more than one line.

In step 84, offscreen the processing logic moves selected text 31 to the destination location. As understood by those skilled in the art, computer 10 maintains in internal memory a copy of the text file that text displayed monitor 12 is part of. This copy is said to be "offscreen." Thus, it will be understood that the activities of step 84 do not alter the text displayed on monitor 12.

In moving selected text 31 to the destination location in step 84, the processing logic performs an intelligent paste, which is also commonly referred to as intelligent cut and paste. Intelligent cut and paste is a set of editing features that account for the need for spaces between words. FIGS. 4A and 4B illustrate how intelligent cut and paste performs. In FIG. 4A, insertion caret 102 is the space immediately following the word "the." Without intelligent cut and paste, after inserting selected text 31 displayed text 33 would not include a space between "Jack" and "the" unless selected text 32 includes a space before "Jack." Stated another way, without intelligent cut and paste, after inserting selected text 31 the sixth line 104 of displayed text 33 would read as "assumed theJack." However, using intelligent cut and paste, the sixth line 104 includes a space between "the" and "Jack," regardless of whether selected text 31 includes a space before "Jack." Thus, using intelligent cut and paste sixth line 104 reads as "assumed the Jack," as illustrated in FIG. 4B.

After moving selected text 31 to the destination location, the processing logic emphasizes selected text 31. As a result when the offscreen copy of the file is finally displayed, the computer users attention will be called to selected text 31 at the destination location. Selected text 31 may be emphasized visually in a great many ways, including displaying selected text 31 in reverse video.

Whether selected text 31 is also removed from the source location during step 78 depends upon whether the computer user has requested a cut and paste or a copy and paste. If a cut and paste operation was selected text 31 is removed from the source location. Otherwise, selected text 31 remains at the source location, but it will no longer be de-emphasized.

The processing logic proceeds to step 86 from step 84. Having moved selected text 31 to the destination location, the processing logic now computes a bounding rectangle for selected text 31 at the destination location. Like bounding rectangle 100, bounding rectangle 104 is defined by two points of selected text 31: the point of text furthest to the top left and the text point furthest to the bottom right. Given insertion point 102, the dimensions of bounding rectangle 104 may vary from those of bounding rectangle 100. This is the case in FIG. 4B.

Preparations for zooming complete, the processing logic branches to step 88 from step 86. In step 88, the processing logic zooms from selected text 31 at the source location to selected text 31 at the destination location. Zooming is a well known visual effect that animates the movement of an object between two points on monitor 12. Methods for animating zooms are well known and will not be described in detail herein. The dimensions of bounding rectangles 100 and 104 are provided to a zoom processor. Given these, the zoom starts with a bounding rectangle 100 displayed near the source location. Two or more rectangles are displayed on monitor 12 at a time, each successive rectangle more closely approaching the dimensions and final location of bounding rectangle 104. FIG. 4C attempts to illustrate this idea. The dimensions of intervening rectangle 106 differ slightly from those bounding rectangle 100, just starting to approach those of bounding rectangle 104. Similarly, the dimensions of intervening rectangle 108 differ from those of intervening rectangle 106, approaching more closely the dimensions of bounding rectangle 104. The zooms ends with the display of bounding rectangle 104 near the destination location.

The processing logic advances to step 90 after the zoom is complete. There the processing logic displays onscreen selected text 31 at the destination location. Following as it does the zoom, the effect of step 78 is that the zoom drops selected text 31 at the destination location.

The processing logic branches to step 92 from step 90 to await activation again.

Additional visual feedback may be provided to the computer user to emphasize that selected text 30 may be dragged within a window, or between windows. Displaying cursor 20 as an arrow, rather than an I-beam, while cursor 20 is over selected text 30 emphasizes this fact. FIG. 5 illustrates in flow diagram form a method for doing so as a background process.

The processing logic begins in step 110 by determining whether cursor 20 is over selected text 30. If cursor 20 is not, the processing logic branches to step 112. There cursor 20 is displayed as an I-beam. On the other hand, if cursor 20 is over selected text 30, the processing logic advances to step 114. During this step the processing logic displays cursor 20 as an arrow, indicating that cursor 20 is over a draggable item.

Thus, a method and apparatus for providing visual feedback to a computer user while manipulating text has been described. The visual feedback includes creation of a text object from selected text, tracking the insertion point as user moves mouse and zooming the selected text from its source location to its destination location.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for providing visual feedback to a computer user while manipulating selected text displayed on a display device of a computer system, the computer system including a control device for interactively positioning a visible symbol, the control device having a button having a first position and a second position, the method comprising the steps of:
   a) in response to the button being in the second position while the visible symbol is over a selected text at a source location;
      1) creating a text object from the selected text;
      2) displaying on the display device the text object over the selected text at the source location;
   b) initializing an interpolation factor, said interpolation factor comprising a value utilized to generate incremental steps between a starting point and an ending point;
   c) computing a distance between the text object and a first point on the display device associated with the location of the visible symbol;
   d) moving the text object along an imaginary line between the source location and the first point to a point on the display device determined by the distance adjusted by the interpolation factor;
   e) with the button in the second position, incrementing the interpolation factor if it has not reached a maximum value, and repeating steps c) through e);
   f) if the button is in the first position over a destination location:
      1) computing a first bounding rectangle for the selected text at the source location;
      2) computing a second bounding rectangle for the selected text at the destination location; and
      3) zooming from the first bounding rectangle at the source location to the second bounding rectangle at the destination location such that the movement of the first bounding rectangle to the size and location of the second bounding rectangle at the destination location is animated.

2. The method of claim 1, further comprising the steps of:
   selecting the selected text at the source location from available text, displayed on the display device; and
   highlighting on the display device the selected text.

3. The method of claim 1, further comprising the step of displaying on the display device the selected text at the destination location after zooming from the first bounding rectangle at the source location to the second bounding rectangle at the destination location.

4. A device for providing visual feedback to a computer user while manipulating selected text displayed on a display device of a computer system, the computer system including a control device for interactively positioning a visible symbol on the display device, the control device having a button having a first position and a second position, the device comprising:

a) a first means for creating a text object from the selected text, the first means responsive to the button being in the second position while the visible symbol is over the selected text at a source location;

b) a second means for initializing an interpolation factor and incrementing the interpolation factor if the interpolation factor has not reached a maximum value, the second means responding to the button being in the second position, said interpolation factor comprising a value utilized to generate incremental steps between a starting point and an ending point;

c) a third means for computing a distance between the text object and a first point on the display device associated with the visible symbol, the third means responsive to the button being in the second position;

d) a fourth means for moving the text object along an imaginary line between the source location and the first point to a point on the display device determined by the distance adjusted by the interpolation factor, the fourth means responding to the button being in the second position; and e) a zooming means for zooming from a first bounding rectangle for the selected block of text at the source location to a second bounding rectangle for the selected block of text at a destination location such that the movement of the first bounding rectangle to the size and location of the second bounding rectangle at the destination location is animated.

5. An apparatus providing visual feedback while manipulating highlighted text, the apparatus comprising:

a) a computer system including:

1) a central processing unit for executing instructions to perform a plurality of processes;

2) a display device for displaying images, text and the highlighted text, the display device being coupled to the central processing unit;

3) a control device for interactively positioning a visible symbol and an insertion caret on the display device, the control device having a button having an up position and a down position, the control device being coupled to the central processing unit;

b) a first process of the plurality of processes, said first process creating a text object from the highlighted text when the button is in the second position while the visible symbol is over the highlighted text at a source location;

c) a second process of the plurality of processes, said second process initializing an interpolation factor and incrementing the interpolation factor;

d) a third process of the plurality of processes, the third process computing a distance between the text object and a first point on the display device associated with the location of the visual symbol when the button is in the second position;

e) a fourth process of the plurality of processes, said fourth process moving the text object along an imaginary line between the source location and the first point to point on the display device determined by the distance multiplied by the interpolation factor, said interpolation factor incremented after each move if the interpolation factor has not reached a maximum, the fourth process executed when the button is in the second position; and f) a zooming process of the plurality of processes, said zooming process causing a zooming from a first bounding rectangle for the selected block of text at the source location to a second bounding rectangle for the selected block of text at the destination location such that the movement of the first bounding rectangle to the size and location of the second bounding rectangle at the destination location is animated.

* * * * *